No. 852,869. PATENTED MAY 7, 1907.
A. CERRUTI.
SOLDER FEED FOR CAN SOLDERING MACHINES.
APPLICATION FILED NOV. 11, 1905.
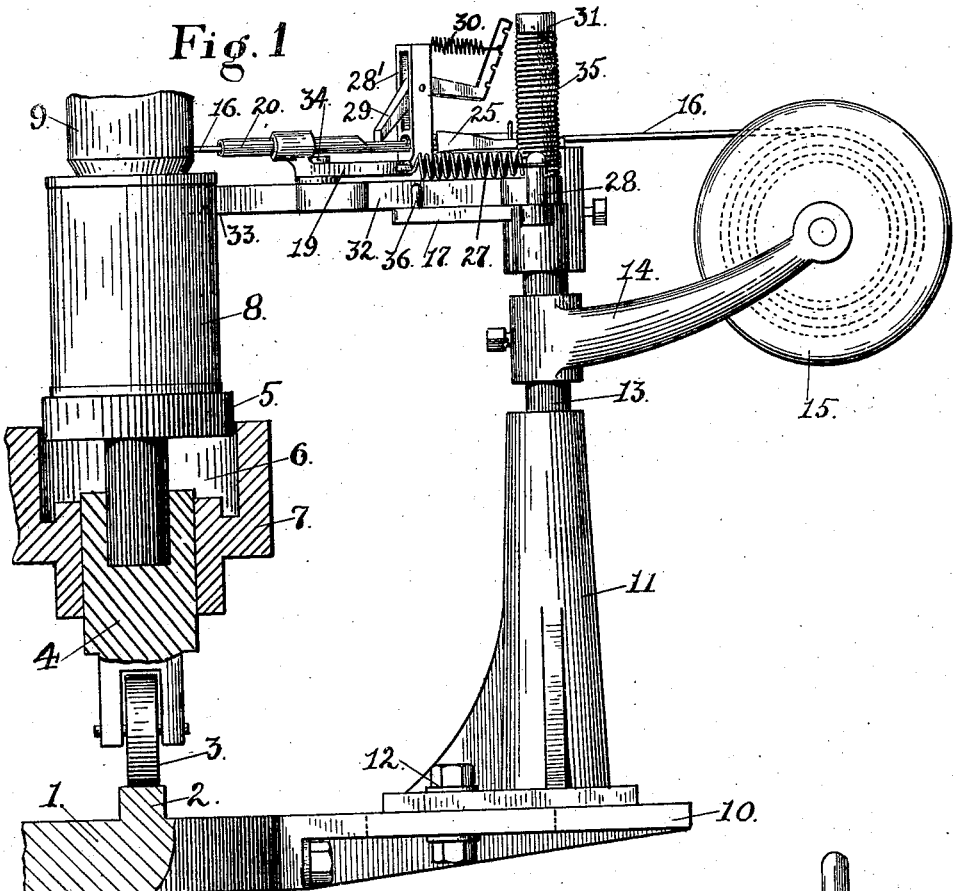
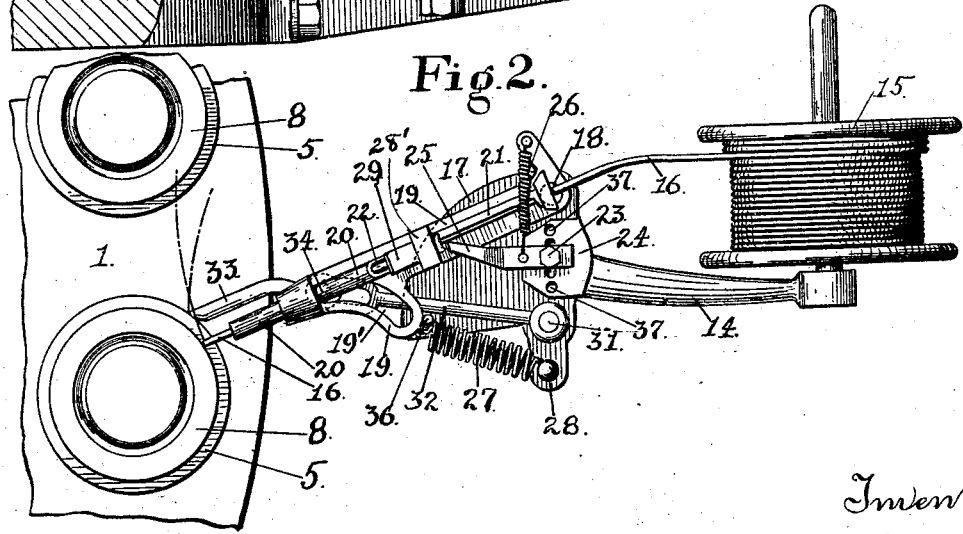
Witnesses:
Arthur L. Slee
J. Compton
Inventor.
Antonio Cerruti
by Wm. F. Booth
his Attorney

UNITED STATES PATENT OFFICE.

ANTONIO CERRUTI, OF SAN FRANCISCO, CALIFORNIA.

SOLDER-FEED FOR CAN-SOLDERING MACHINES.

No. 852,869.          Specification of Letters Patent.          Patented May 7, 1907.

Application filed November 11, 1905. Serial No. 286,776.

*To all whom it may concern:*

Be it known that I, ANTONIO CERRUTI, a citizen of the United States, residing at the city and county of San Francisco, State of California, have invented certain new and useful Improvements in Solder-Feeds for Can-Soldering Machines; and I do hereby declare the following to be a full, clear, and exact description of the same.

My invention relates to that class of solder-feeding mechanisms in which the solder wire is adapted to be fed into contact with the soldering irons by the action of the traveling cans and is specially adapted for use in connection with that form of can cap soldering machines in which the cans move in a rotary path, each can being at the proper time raised into contact with, and again removed from a soldering iron above, which iron is one of a series which also moves in a rotary path.

My invention has for its main object the provision of a solder feed mechanism in which the guide which directs the solder wire is adapted to swing to cause the solder wire to accompany the iron for a sufficient length of time to thoroughly apply the solder.

Other objects are to provide for the necessary adjustments and the accurate feed of the solder wire, to all of which ends my invention consists in the novel construction and arrangement and combination of parts, which I shall now describe by reference to the accompanying drawings, in which—

Figure 1 is a side elevation of my solder feed, showing its operation by means of a passing can. Fig. 2 is a top view of the same.

In Fig. 1, 1 is the table of the soldering machine, having upon it a track 2, on which travels the wheel 3, of a vertically movable piece 4, carrying in its top a can rest 5, suitably guided in the socket 6 of a carrier 7, which may be supposed to have a rotary motion. Upon top of the can rest 5 is the can 8, above which is represented a portion of the soldering iron 9 which accompanies the can in its rotary motion. It need only be said of these parts that as the carrier 7 moves about its center, the can 8 and the iron 9 are carried in a circular path, and as the track 2 is a cam track, the can is at the proper time raised to and removed from the soldering iron 9.

Projecting from the table 1, is a bracket 10, to which is secured a post 11, the attachment being by means of a bolt 12, which by playing through a slot in the bracket, indicated by dotted lines, adapts the post to be adjusted nearer to, or farther from the soldering machine. In the post 11, is fitted a spindle 13, upon which is adjustably mounted a bracket 14, which carries the reel 15 upon which the solder wire 16 is wound. On the same spindle 13, above the reel bracket 14, is adjustably mounted the bed plate 17 of the solder feed. Upon a pin 18, rising from the bed plate 17, (Fig. 2) is pivotally mounted the solder wire carrying arm 19, whereby said arm is adapted to move through an arc with the pin 18 as a center. Secured to and practically forming a part of the solder wire carrying arm 19, is the solder guide tube 20, through which the solder wire 16, from the reel 15 passes, as is clearly shown in Fig. 2. This solder wire tube 20, near its rear portion, is open, on its side, as is indicated at 21, whereby the solder wire is exposed through the open side, as is shown in said Fig. 2. The solder tube a little farther forward, is open on top, as is shown at 22, whereby the solder wire is exposed through said open top.

Pivoted at the point 23, Fig. 2, upon top of an uprising bearing 24, of the bed plate 17, is the feed pawl 25, the forward end of which engages the solder wire through the open side 21 of the solder tube. This engaging end of the said pawl 25 is so beveled that it slips freely backward over the wire, but engages said wire upon a forward movement, and pushes the wire forward. A spring 26 controls the said pawl 25. A spring 27, secured at one end to a pin 28, rising from the bed plate 17, and at the other end to the solder carrying arm 19, controls said arm. Rising from said arm is a bearing 28′, in which is pivoted a retaining pawl 29, which is adjustably controlled by a spring 30. The rear portion of this retaining pawl, together with its controlling spring, is omitted in Fig. 2, but is seen plainly in Fig. 1. The lower end of the retaining pawl engages the solder wire where it is exposed through the open top 22 of the solder tube 20, and said edge is so beveled as to allow the solder wire to slip freely forward, but to prevent it from being pushed or drawn backward.

Pivoted upon a post 31, rising from the bed plate 17, is a lever 32, which passes under the solder carrying arm and has its forward contact end 33 projecting into the path of the can 8. This lever is connected by a sliding joint with the solder wire carrying arm 19, said joint being formed by means of a stud 34, adjustably secured in a slotted portion of the lever, playing freely in a slotted portion 19' of the arm 19. A spring 35 fitted around the post 31, bears down upon the pivoted head of the lever 32, and holds it in place, Fig. 1. The return movement of the parts under the influence of the spring 27, is limited by a fixed pin 36 in the bed plate 17, against which the lever 32 brings up.

The operation of the device is as follows. In the position shown in Fig. 1, the spring 27 has drawn the solder wire carrying arm 19 and the lever 32 connected with it, to their initial position; in which position, the solder wire 16 is projected to its limit, to come into and to remain in contact with the soldering iron 9; and the contact end 33 of the lever, lies well within the path of the can. Now, as the carrier 7 revolves and carries the can 8 and iron 9 with it, said can pressing against the contact end 33 of the lever 32, will swing said lever forward about its pivot post 31 on an arc indicated in Fig. 2. This movement of the lever through its connection with the solder wire carrying arm 19, will cause said arm to swing forwardly with it, about its pivot pin 18, as a center, on the arc indicated in Fig. 2. By this movement the solder wire projecting from its guide is carried into contact with the iron and accompanies said iron for a time sufficient to cause it to be well applied thereto, in contradistinction to the brief and insufficient wiping action of a traveling iron against a stationary solder wire. The movement of the solder wire arm and its guide tube causes the feed pawl 25, swinging under the influence of its spring 26, to travel backwardly freely, over the solder wire. When the limit of this swinging movement is reached, which is when the path of the can 8 diverges from the path of the contact point 33 of the lever 32, the spring 27 will return the parts of the solder feed to their initial positions. In this return, the movement is such that the said pawl 25, gripping the solder wire at a point far back, now advances said solder wire so as to project it to its limit for a second operation. During these movements, the operation of the retaining pawl 29 is that of this class of pawls, namely, to hold the solder wire from any return movement.

The length of stroke of the feed pawl 25 and the consequent projection of the solder wire may be varied by pivoting the pawl in different holes 37 in the top of the bearing 24. Or said stroke may be varied by varying the swing of the solder wire arm, due to changing the position of the bolt 34, in the lever 32. The movement of the arm 19 may also be varied by swinging the bed plate 17 on its spindle 13 slightly so that the end 33 of the lever 32 does not project so far into the path of the cans. The device may be adjusted to suit different sized cans, by the adjustment of the carrying post 11 on the table bracket 10. This adjustment provides for any stated contact and movement of the lever 32, irrespective of the diameter of the can, for it is obvious that the device, by being moved closer to the table, will carry the contact end 33 of its lever farther in and consequently under the contact influence of a greater arc of the circumference of a small can, or farther out to be affected by a smaller arc of a large can, resulting in a stated or given movement of the lever by either sized can.

Having thus described my invention, what I claim as new and desire to secure by Letters Patent is—

1. In a solder feed for can soldering machines, a traveling iron and a moving solder-wire guide adapted to cause the wire to temporarily move in the same direction as the traveling soldering iron.

2. In a solder feed for can soldering machines, the combination of a movable solder-wire guide, adapted to present the wire to the traveling soldering iron, and means operated by the traveling can for moving said guide to cause the wire to accompany the iron, temporarily only.

3. In a solder-feed for can soldering machines, the combination of a swinging solder-wire guide adapted to present the wire to the traveling soldering iron, a swinging lever projecting into the path of the traveling can, whereby it is operated, and a connection between the lever and the solder wire guide, to swing the latter to cause the wire to move along with and accompany the iron, only temporarily when said iron is moving.

4. In a solder-feed for can soldering machines, the combination of a swinging solder-wire guide adapted to present the wire to the traveling soldering iron, a swinging lever projecting into the path of the traveling can, whereby it is operated, a connection between the lever and the solder wire guide, to swing the latter to move along with and cause the wire to temporarily accompany the iron while the latter is moving, and a feed pawl to project the wire, arranged to be operated by the swinging of the wire guide.

5. In a solder-feed for can-soldering machines, a traveling iron a swinging guide for the solder wire, a feed-pawl for advancing said wire through its guide, said pawl being pivotally arranged to cause it to reciprocate relatively to the wire-guide, and in accordance with the swinging of said guide, a pivoted lever projecting into the path of the cans in the soldering machine, whereby it is moved by said cans along with the soldering iron, and a suitable connection between the lever and wire-guide, to effect the movement of said guide.

6. A solder-feed for can-soldering machines, consisting of a swinging guide for the solder wire, a feed-pawl for advancing